United States Patent [19]
Frisch

[11] 3,912,291

[45] Oct. 14, 1975

[54] SHOPPING CART SHELF ASSEMBLY

[76] Inventor: Donald H. Frisch, 6759 Mineral Drive, San Diego, Calif. 92119

[22] Filed: Aug. 2, 1974

[21] Appl. No.: 494,022

[52] U.S. Cl. ............................ 280/33.99 A; 211/135
[51] Int. Cl.² ...................... B62B 11/00; B62B 5/00
[58] Field of Search ............ 280/33.99 A, 33.99 R, 280/33.99 F, 33.99 H, 33.99 S; 108/47, 52, 108/143; 40/10 R, 16.4, 308; 211/135; 248/205, 188.1

[56] References Cited
UNITED STATES PATENTS

| | | | |
|---|---|---|---|
| 905,737 | 12/1908 | McCombe | 211/135 |
| 2,888,761 | 6/1959 | Miller | 280/33.99 A |
| 3,026,122 | 3/1962 | Young | 280/33.99 H |
| 3,251,543 | 5/1966 | Bush et al. | 280/33.99 A |
| 3,265,297 | 8/1966 | Behrens | 280/33.99 A |
| 3,539,204 | 11/1970 | Keller | 40/10 R |

FOREIGN PATENTS OR APPLICATIONS

| | | | |
|---|---|---|---|
| 252,120 | 2/1967 | Austria | 280/33.99 H |

*Primary Examiner*—David Schonberg
*Assistant Examiner*—David M. Mitchell

[57] ABSTRACT

A shopping cart shelf assembly dimensioned and adapted for attachment to a conventional shopping cart resulting in a horizontal elongated surface in the vicinity of the cart push handle which can be utilized for checking off a grocery list or writing checks thereon while standing in a check-out line. The shelf mounting brackets are coupled to the shelf and the cart in the manner for adapating a universal fit to standard state of the art shopping carts.

3 Claims, 4 Drawing Figures

SHOPPING CART SHELF ASSEMBLY

BRIEF DESCRIPTION OF THE INVENTION

The present invention relates to a shopping cart shelf assembly and more particularly to a shopping cart shelf assembly having universal mounting to existing standard shopping carts.

According to the invention, a shopping cart shelf is provided for attachment to a standard shopping cart at the push handle portion of the shopping cart in the back region thereof which serves as a surface for writing checks while standing in a check-out line or checking off the grocery list, etc. Mounting brackets are coupled to the shelf and in turn to the rear portion of the shopping cart in a manner to allow for a universal fit of the shelf to existing shopping carts. A modification envisions a telescoping end of the shelf for cases where the width of this shopping cart deviates greatly from that of the majority.

An object of the present invention is the provision of a shopping cart shelf assembly for mounting on the back portion of a standard shopping cart. Another object of the invention is the provision of a shopping cart shelf assembly having substantially universal mounting adjustments to shopping carts.

Yet another object of the invention is the provision of a shopping cart and shelf which is simple to manufacture and extremely convenient in use.

A still further object of the invention is the provision of a shopping cart shelf which can be easily attached and removed from existing shopping carts.

Other objects and many of the attendant advantages of the present invention will be readily appreciated as the same becomes better understood by reference to the following detailed description when considered in connection with the accompanying drawing in which like reference numerals designate like parts throughout the Figures thereof and wherein.

DETAILED DESCRIPTION OF THE DRAWING

Figure 1:
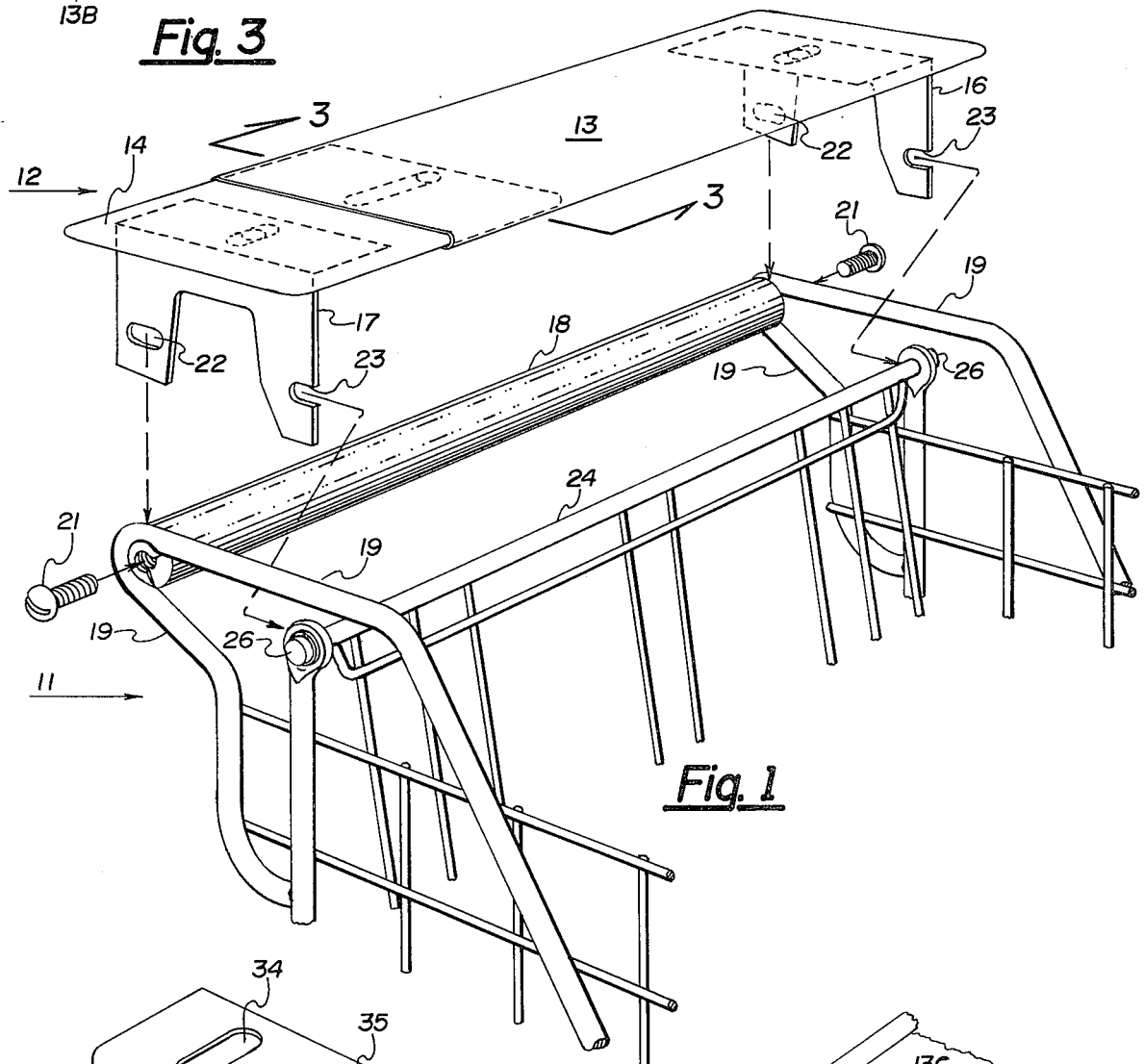
FIG. 1 is an exploded perspective view of the present invention spatially disposed from a standard shopping cart.

Referring to FIG. 1, the top back portion of a standard shopping cart is shown generally at 11 with the shopping cart shelf of the present invention disposed above shopping cart 11 generally indicated at 12. The shelf assembly 12 consists of a shelf member 13 which slidably receives an end member 14. Mounting bracket 16 is attached to shelf portion 13 and mounting bracket 17 is attached to shelf bracket 14. Shopping cart 11 has a back push bar 18 which is coupled to rearwardly extending frame members 19 of shopping cart 11 via screws 21. Elongated slots 22 of mounting brackets 16 and 17 are dimensioned and spatially disposed for cooperation with screws 21 and thereby attachment to rearwardly extending frame members 19. Recesses 23 in mounting brackets 16 and 17 are dimensioned and spatially disposed for attachment to cross bar member 24 of shopping cart 11 and are attached via bolts 26 thereto.

Figure 2:
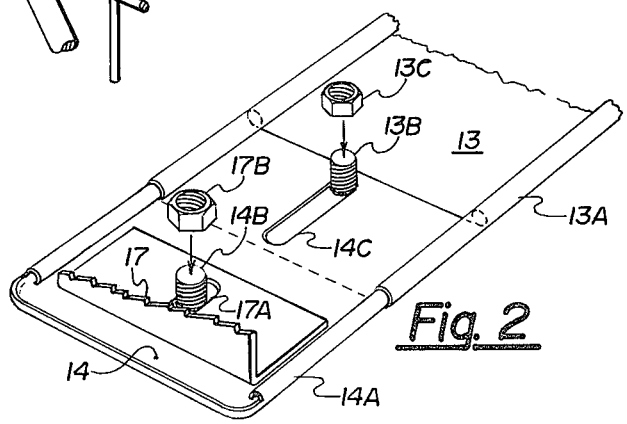
FIG. 2 is a bottom view of a portion of the shopping cart shelf of FIG. 1.

Referring to FIG. 2, end member 14 is shown being slidably received by shelf member 13 via rolled edges 14A and 13A, respectively. Mounting bracket 17 is coupled to end member 14 via stud 14B and nut 17B. End member 14 is positioned to shelf member 13 via elongated slot 14C and stud 13B and nut 13C.

Figure 3:
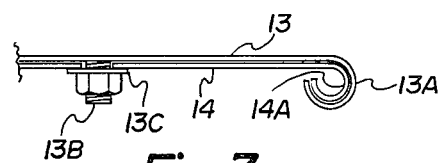
FIG. 3 is a sectional view taken along lines 3 — 3 of FIG. 1.

Referring to FIG. 3, shelf member 13 is shown having slidably received a portion of end member 14 with stud 13B extending from the bottom surface of shelf member 13 and nut 13C clamping end portion 14 to shelf member 13.

Figure 4:
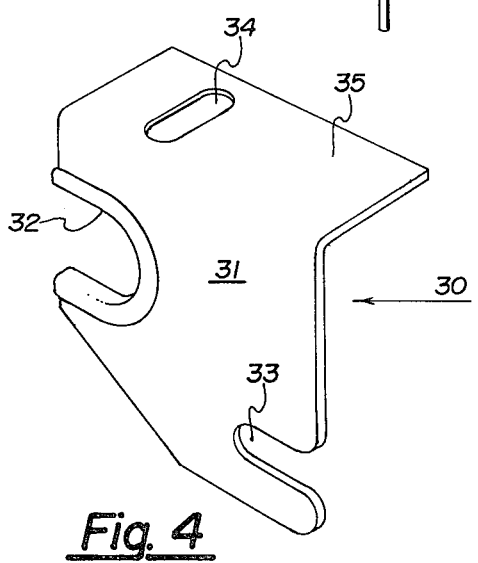
FIG. 4 is a modification of the mounting brackets of the embodiment of FIG. 1.

Referring to FIG. 4, a mounting bracket modification 31 is shown having a padded recess 32 in a rear portion thereof and a recess 33 in a front portion thereof together with an elongated slot 34 in a horizontal portion of the bracket 31.

OPERATION

Referring back to FIGS. 1, 2 and 3, it can be seen that brackets 16 and 17 are attached by their horizontal portions (shown in dotted lines) to the underside of shelf portions 13 and end portion 14, respectively. This can be as by bolting as shown more clearly in FIG. 2, or it can be more permanently attached as by brazing. End member 14 is slidably received at its edges 14A by shelf member 13 by its rolled edges 13A more clearly shown in FIG. 3. After the length of the shelf has been determined by the width of the particular shelf cart, it is to be attached thereto, the nuts 17B and 13C tightened on studs 14B and 13B (FIG. 2). Screws 21 are removed from push bar 18 and nuts 26 are removed from cross member 24 and the shelf is attached thereto via brackets 16 and 17. A modification is shown in FIG. 4 whereby the bracket 30 merely receives push bar 18 in padded recess 32. The padding on recess 13 can be plastic or neophrene, for example. Recess 33 operates much the same as recesses 23 in FIG. 1 and cooperates with cross bar member 24 and bolts and nuts 26 for attachment. If a large number of shelves are to be manufactured for a particular cart, the telescoping of end member 14 and shelf member 13 can be eliminated and it can be all one piece with the elongated slots taking up any small variation in cart width.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

I claim:

1. On a shopping cart of the type utilized by customers in retail outlets in which a substantially rectangularly cross-sectioned wire basket terminating in its upper rear portion in a rigid structural bar for carrying various items of merchandise is mounted on wheels or casters and has a rearwardly protruding handle parallel to said rigid structural bar for pushing the cart, the improved shelf assembly comprising:

a flat substantially rectangular shelf member; and
first and second mounting brackets extending downwardly from on each end of said shelf member, said first and second mounting brackets being spaced apart a distance substantially equal to the width of the shopping cart and being attached to said handle and to said rigid structural bar.

2. The improvement of claim 1 wherein:

each of said downwardly extending first and second mounting brackets has an elongated slot for coupling to said handle and a recess for coupling to said rigid structural bar.

3. The improvement of claim 1 in which at least one of said first and second downwardly extending mounting brackets has a first recess for coupling to said handle member and a second recess for coupling to said rigid structural bar.

* * * * *